(12) United States Patent
Park et al.

(10) Patent No.: US 8,836,896 B2
(45) Date of Patent: Sep. 16, 2014

(54) OPTICAL SHEET FOR CONTROLLING THE DIRECTION OF A LIGHT RAY

(75) Inventors: Jun-Sang Park, Gyeongsangbuk-do (KR); Jeong-Tae Seo, Gyeongsangbuk-do (KR); Hee-Cheong Lee, Gyeonggi-do (KR); Sang-Hoon Lee, Gyeongsangbuk-do (KR); Tae-Yong Ryu, Seoul (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 569 days.

(21) Appl. No.: 12/557,001

(22) Filed: Sep. 10, 2009

(65) Prior Publication Data
US 2011/0037925 A1      Feb. 17, 2011

(30) Foreign Application Priority Data
Aug. 12, 2009   (KR) .......................... 10-2009-0074231

(51) Int. Cl.
| | | |
|---|---|---|
| G02F 1/1335 | (2006.01) | |
| F21V 5/00 | (2006.01) | |
| F21V 5/04 | (2006.01) | |
| G02B 5/02 | (2006.01) | |

(52) U.S. Cl.
CPC .. G02B 5/0215 (2013.01); *G02F 2001/133607* (2013.01)
USPC ................. 349/95; 349/62; 349/64; 362/327; 362/333; 362/335

(58) Field of Classification Search
USPC .................. 349/95, 62, 64–67; 362/327, 328, 362/333–336, 338
See application file for complete search history.

(56) References Cited

U.S. PATENT DOCUMENTS

| | | | | |
|---|---|---|---|---|
| 7,113,333 | B2 * | 9/2006 | Kamijima ...................... | 359/456 |
| 7,309,153 | B2 * | 12/2007 | Arihara ......................... | 362/615 |
| 7,568,820 | B2 * | 8/2009 | Kodama et al. ............... | 362/330 |
| 8,096,669 | B2 * | 1/2012 | Ito et al. ....................... | 362/97.2 |
| 2005/0254771 | A1 * | 11/2005 | Yamashita et al. ............ | 385/146 |
| 2007/0076406 | A1 * | 4/2007 | Kodama et al. ................ | 362/97 |
| 2010/0182534 | A1 | 7/2010 | Usukura et al. ................ | 349/62 |

FOREIGN PATENT DOCUMENTS

| | | |
|---|---|---|
| JP | H09-033701 | 2/1997 |
| JP | H10-241434 | 9/1998 |
| JP | 2007-133367 | 5/2007 |
| JP | 2007-139961 | 6/2007 |
| JP | 2008-249785 | 10/2008 |
| JP | 2009-116014 | 5/2009 |
| KR | 10-2007-0041389 | 4/2007 |
| KR | 10-2009-0083056 | 8/2009 |
| WO | WO 2008/155878 | 12/2008 |

\* cited by examiner

*Primary Examiner* — Bumsuk Won
*Assistant Examiner* — Paisley L Arendt
(74) *Attorney, Agent, or Firm* — Harness, Dickey & Pierce, P.L.C.

(57) ABSTRACT

The present disclosure relates to an optical sheet for controlling the direction of light rays which is used for manufacturing backlight units of TFT-LCDs for computer monitors and televisions, and more specifically to an optical sheet which can uniformly diffuse light, improve brightness, and adjust viewing angle. There is provided an optical sheet for controlling the direction of light rays comprising a substrate film; a microlens group arranged on a first face of the substrate film; and a plurality of protuberances formed on a second face of the substrate film, wherein each protuberance comprises a reflective layer at the bottom thereof, and the plurality of protuberances comprise an aperture formed therebetween, and wherein a unit microlens of the microlens group has a first side and a second side with different radii of curvature from each other with respect to a light emission control part thereof.

15 Claims, 4 Drawing Sheets

OPTICAL SHEET FOR CONTROLLING THE DIRECTION OF A LIGHT RAY

CROSS-REFERENCE TO RELATED APPLICATION

This application claims the benefit and priority to Korean Patent Application No. 10-2009-0074231, filed Aug. 12, 2009. The entire disclosure of the application identified in this paragraph is incorporated herein by reference.

FIELD

The present disclosure generally relates to an optical sheet for controlling the direction of light rays which is used for manufacturing backlight units of Thin Film Transistor-Liquid Crystal Display (TFT-LCD) for computer monitors, televisions (TVs) and so on. More specifically, the disclosure relates to an optical sheet for controlling the direction of light rays, which can uniformly diffuse light, improve brightness, and adjust viewing angle when the light emitted from light source lamps located at the sides or back of a backlight unit passes therethrough, thereby securing clearer photo-images and making it possible to control the direction of light rays.

BACKGROUND

This section provides background information related to the present disclosure which is not necessarily prior art.

In general, since the liquid crystal of a liquid crystal displays (LCD) is itself not a light-emitting element (unlike other types of flat panel displays), an additional light-emitting device is necessary to improve the brightness of the display screen.

For such a light-emitting device, different types of methods can be used, such as a frontlight technique or a backlight technique. The backlight technique is an indirect lighting method in which the light is emitted from a light source of a backlight unit mounted on the rear side of a display device, is converted into a primary planar light through an light guide plate LGP) or a diffusion plate, and is reflected by a reflection plate such as a metal deposit plate or an opaque white plate so as to emit the light onto a front surface of the display panel, thereby improving the brightness of the display screen. In such a backlight technique, the best image quality should be implemented with minimum energy consumption.

Conversion into a planar light source is important in the backlight technique. A general planar light source uses a variety of diffusion plates which irregularly diffuse light flux to secure brightness uniformity at the light flux emitting-surface. Because of diffusion, light flux emitted from the emitting-surface does not have a specific direction but radiates over a large area. Accordingly, various optical sheets are mounted on the backlight unit to focus the emission direction of light flux onto a smaller area and to control the light emission in a desired direction. For example, as a method to improve the viewing angle dependency of LCDs (which has been an obstacle for the expansion of application of LCDs), techniques have been presented to mount various light diffusion sheets or microlens array sheets onto diffusion plates or LGPs.

However, though such a method described above is effective in controlling a viewing angle in predetermined uniform directions, it is not effective in controlling the viewing angle in irregular directions. In other words, a construction of backlight sheet of LCDs is needed which can enhance the efficiency of the usage of light rays within a viewing angle of a certain direction.

SUMMARY

The present disclosure is designed, in part, to solve the above-mentioned problems. In an embodiment, the present disclosure provides an optical sheet for controlling the direction of light rays, which can uniformly diffuse light, improve brightness, and adjust viewing angle when the light emitted from light source lamps located at the sides or back of a backlight unit passes therethrough, thereby securing clearer photo-images and making it possible to control the direction of light rays. These advantages of the present disclosure will be apparent from the following detailed description.

The above object can be achieved by an optical sheet for controlling the direction of light rays comprising: a substrate film; a microlens group arranged on a first face of the substrate film; and a plurality of protuberances formed on a second face of the substrate film, each protuberance comprising a reflective layer at the bottom thereof, and the plurality of protuberances having an aperture formed therebetween, wherein a unit microlens of the microlens group has a first side and a second side with different radii of curvature from each other with respect to a light emission control part thereof.

Here, the light emission control part and the vertex of the first side of the unit microlens form an angle $\theta_1$ which is greater than or equal to about 10° and less than about 90°, and the light emission control part and the vertex of the second side of the unit microlens form an angle $\theta_2$ which is greater than or equal to about 10° and less than about 90°. In a particular aspect of this embodiment, the angle $\theta_1$ is determined by an equation of a curve $f(X_1)$ which defines the curvature of the first side of the unit microlens and $\tan(\theta_1)$ which is derived by Equation 1, and the angle $\theta_2$ is determined by an equation of a curve $f(X_2)$ which defines the curvature of the second side of the unit microlens and $\tan(\theta_2)$ which is derived by Equation 2, wherein $$\text{Equation 1 is } \frac{df(X_1)}{dX_1} = \tan\theta_1, \text{ and}$$

$$\text{Equation 2 is } \frac{df(X_2)}{dX_2} = \tan\theta_2.$$

In other embodiments, the radii of curvature of the first side and the second side of the unit microlens are respectively of about 10 μm to about 1000 μm.

In another embodiment, the ratio of area (aperture ratio) taken by the apertures between the protuberances is about 10% to about 90% of the total area of the second face of the substrate film, and each protuberance is formed such that the center of the protuberance is located at the pitch center of the unit microlens with respect to the light emission control part.

In a particular embodiment, the reflective layer has a thickness of about 1 μm to about 100 μm.

In yet another embodiment, the unit microlens has a height of about 1 to about 2 times of the pitch thereof.

Within this disclosure, there is also provided a backlight assembly comprising the optical sheet for controlling the direction of light rays, comprising: a substrate film; a microlens group arranged on a first face of the substrate film; and a plurality of protuberances formed on a second face of the substrate film, each protuberance comprising a reflective layer at the bottom thereof, and the plurality of protuberances comprising an aperture formed therebetween, wherein a unit microlens of the microlens group has a first side and a second side with different radii of curvature from each other with respect to a light emission control part.

In some embodiments of the backlight assembly, the light emission control part and the vertex of the first side of the unit microlens form an angle $\theta_1$ which is greater than or equal to about 10° and less than about 90°, and the light emission control part and the vertex of the second side of the unit microlens form an angle $\theta_2$ which is greater than or equal to about 10° and less than about 90°. In a particular aspect of this embodiment of the backlight assembly, the angle $\theta_1$ is determined by an equation of a curve $f(X_i)$ which defines the curvature of the first side of the unit microlens and $\tan(\theta_i)$ which is derived by Equation 1, and the angle $\theta_2$ is determined by an equation of a curve $f(X_2)$ which defines the curvature of the second side of the unit microlens and $\tan(\theta_2)$ which is derived by Equation 2, wherein $$\text{Equation 1 is } \frac{df(X_1)}{dX_1} = \tan\theta_1, \text{ and}$$

$$\text{Equation 2 is } \frac{df(X_2)}{dX_2} = \tan\theta_2.$$

In some embodiments of the TFT-LCD, the light emission control part and the vertex of the first side of the unit microlens form an angle $\theta_1$ which is greater than or equal to about 10° and less than about 90°, and the light emission control part and the vertex of the second side of the unit microlens form an angle $\theta_2$ which is greater than or equal to about 10° and less than about 90°. In a particular aspect of this embodiment of the TFT-LCD, the angle $\theta_1$ is determined by an equation of a curve $f(X_i)$ which defines the curvature of the first side of the unit microlens and $\tan(\theta_1)$ which is derived by Equation 1, and the angle $\theta_2$ is determined by an equation of a curve $f(X_2)$ which defines the curvature of the second side of the unit microlens and $\tan(\theta_2)$ which is derived by Equation 2, wherein $$\text{Equation 1 is } \frac{df(X_1)}{dX_1} = \tan\theta_1, \text{ and}$$

$$\text{Equation 2 is } \frac{df(X_2)}{dX_2} = \tan\theta_2.$$

The present disclosure has an effect of providing uniform light diffusion, brightness improvement and viewing angle adjustment, thereby securing clearer photo-images and of making it possible to control the direction of light rays.

BRIEF DESCRIPTION OF THE DRAWINGS

The drawings described herein are for illustrative purposes only of selected embodiments and not all possible implementations, and are not intended to limit the scope of the present disclosure.

BRIEF DESCRIPTION OF THE PARTS OF THE DRAWINGS

1: optical sheet for controlling the direction of light rays,
2: microlense,
3: substrate film,
4: reflective layer,
5: aperture,
6: protuberance,
7: light emission control part,
8: first side,
9: second side,
10: pitch, and
11: height.

DETAILED DESCRIPTION

Hereinafter, various embodiments of the present disclosure will be described in detail with reference to the accompanying drawings. It should be understood that the detailed description of the embodiments are given by way of illustration only, and accordingly various changes and modifications within the scope of the disclosure will become apparent to those skilled in the art.

In order to provide an optical sheet for controlling the direction of light rays in accordance with the present disclosure, it is necessary to control the emission direction of light flux into a predetermined range. This is to prevent the decrease of light efficiency due to the emission of light flux must be controlled in unnecessary directions. That is, a good light efficiency can be secured by controlling the emission angle of light flux.

Figure 1:
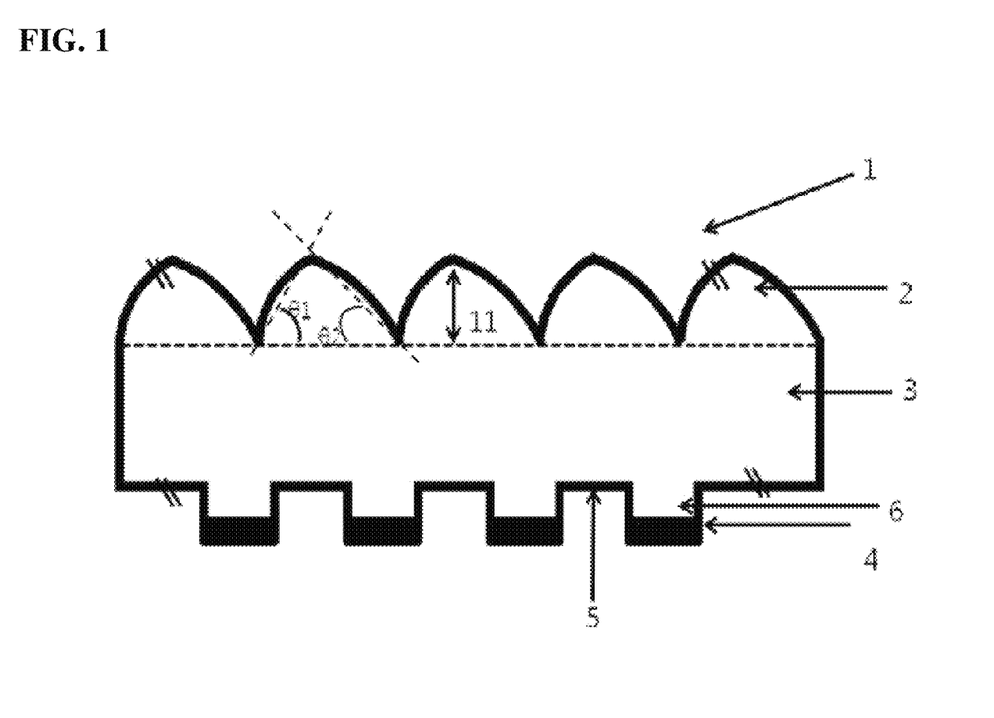
FIG. 1 is a cross-sectional view of an optical sheet for controlling the direction of light rays of the present disclosure.
Figure 2:
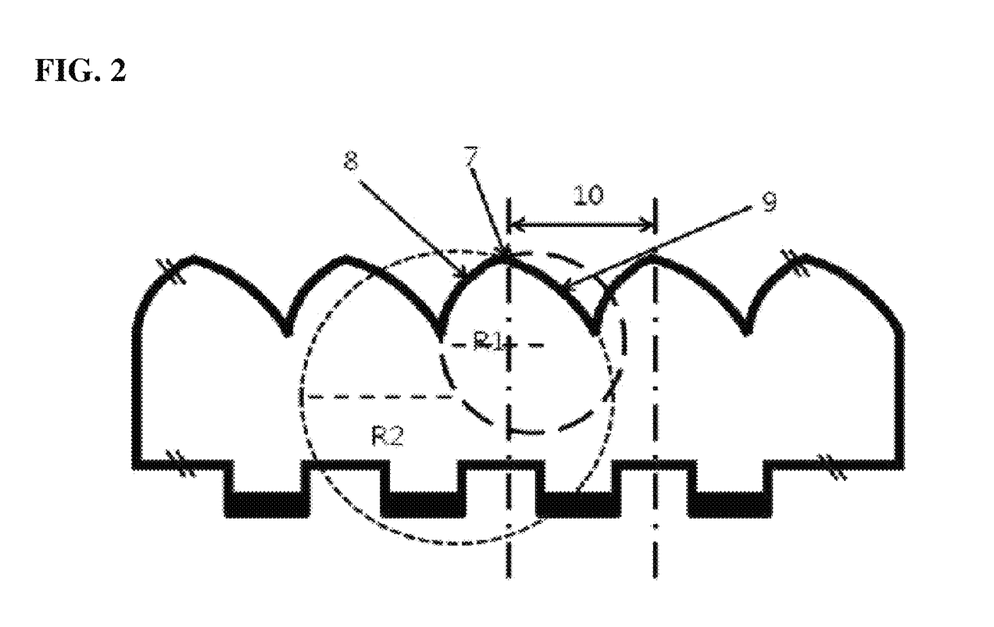
FIG. 2 is a cross-sectional view illustrating the concept of an optical sheet for controlling the direction of light rays of the present disclosure.

An optical sheet 1 for controlling the direction of light rays of the present disclosure comprises a substrate film 3 (hereinafter, it is also referred to as "main body") a first face of which has microlenses 2 arranged thereon to form a microlens group, and a second face of which has a plurality of protuberances formed thereon. Each protuberance is provided with a reflective layer 4 at its bottom. Each aperture 5 formed between the protuberances 6 has an opening on the part near the focal point of each microlens 2. In order to control a viewing angle, the microlenses 2 on the first face comprise a first side 8 and a second side 9 with respect to the focal point of each microlens or a light emission control part 7, and the first side 8 and the second side 9 have different radii of curvature from each other.

Next, the light emission control part 7 at the vertex of the first side 8 of the unit microlens and the first face form an angle $\theta_1$ which is greater than or equal to about 10° and less than about 90°, and the light emission control part 7 at the vertex of the second side 9 of the unit microlens and the first face form an angle $\theta_2$ which is greater than or equal to about 10° and less than about 90°.

In addition, the angle $\theta_1$ is determined by an equation of a curve $f(X_1)$ which defines the curvature of the first side 8 of the unit microlens and $\tan(\theta_1)$ which is derived by Equation 1, and the angle $\theta_2$ is determined by an equation of a curve $f(X_2)$ which defines the curvature of the second side 9 of the unit microlens and $\tan(\theta_2)$ which is derived by Equation 2. Equations 1 and 2 are as follows:

$$\frac{df(X_1)}{dX_1} = \tan\theta_1, \text{ and} \qquad \text{Equation 1}$$

$$\frac{df(X_2)}{dX_2} = \tan\theta_2. \qquad \text{Equation 2}$$

Furthermore, the ratio of area taken by the apertures 5 between the protuberances 6, or the aperture ratio is about 10% to about 90% of the total area of the second face of the substrate film 1, and each protuberance is formed such that the center of the protuberance is located at the pitch 10 center of the unit microlens with respect to the light emission control part 7.

Next, the reflective layer 4 has a thickness of about 1 μm to about 100 μm. In addition, the radius of curvature ($R_1$) of the first side 8 and the radius of curvature ($R_2$) of the second side 9 are different from each other. In some embodiments, $R_1$ is of about 10 μm to about 1000 μm, and $R_2$ is also of about 10 μm to about 1000 μm. In a particular aspect of this embodiment, height 11 of the unit microlens is of about 1 to about 2 times of the pitch thereof.

The microlenses 2 of the optical sheet for controlling the direction of light rays in accordance with the present disclosure may be produced using one or more of the resins selected from ultraviolet-curable resin, electron-beam-curable resin and heat-curable resin, or may be produced using one of the resins selected from polyester-based, polyvinyl chloride-based, polycarbonate-based, polymethylmethacrylate-based, polystyrene-based, polyestersulfone-based, polybutadiene-based, acrylic and olefin-based resins alone or in combination of two or more. In particular embodiments, one or more of the resins can be selected from polyethylene terephthalate, polycarbonate, acrylic and cycloolefin resins.

For the reflective layer 4, reflective materials can be used, which include, but are not limited to, various metals such as aluminum, chromium and so on and, vapor deposited oxide films thereof, and various resins having white pigments such as titan, lithopone, zinc oxide, white lead, and zinc sulfide scattered therein. In some embodiments, such materials can have a reflectivity of about 80% or higher. If less than about 80%, light loss is too high. To produce the reflective layer 4, conventional printing techniques are used, and more specifically, the reflective layer 4 is coated on each protuberance 6 using various printing techniques such as gravure printing, offset printing, silk screen printing, and inkjet printing. In general, when the content of reflective material in the reflective layer is constant, reflectivity and quantity of light towards the front face increase as the coating thickness of the reflective layer gets thicker, thereby enhancing LCD brightness. However, when the coating thickness is larger than about 100 μm, wrinkles can occur on the entire sheet due to loss of flexibility in the coating layer. This quality deterioration may very likely be caused by decreased adhesive strength of the coating layer. When the coating thickness is constant, reflectivity and quantity of light towards the front face increases as the content of reflective material increases, thereby enhancing LCD brightness. However, too much reflective material may cause problems such as deterioration of curing during the coating process.

In some embodiments, the protuberances 6 for the formation of the reflective layers 4 may be produced by a photomask exposure process.

Depending on the desired use or structure of the optical sheet for controlling the direction of light rays, various treatments such as an anti-static treatment, hard coating, adhesion processing, or cohesion with other substrates may be performed on the surface of the microlens group or the reflective layer face.

The substrate film 2 in accordance with the present disclosure may be produced using one of the resins selected from polyester-based, polyvinyl chloride-based, polycarbonate-based, polymethylmethacrylate-based, polystyrene-based, polyestersulfone-based, polybutadiene-based, acrylic and olefin-based resins, and any combination thereof. In particular, a sheet can be produced using one or more of the resins selected from polyethylene terephthalate, polycarbonate, acrylic and cycloolefin resins. Moreover, the substrate film 2 may be produced as a laminate comprising any of the above-mentioned resins. Lamination can be performed by a co-extrusion process of two or more of the resins mentioned above. To control the mechanical properties of the optical sheet such as thermal expansion, thermal contraction or surface hardness, an optical sheet comprising two or more resin layers can be manufactured to control the direction of light rays.

The selection of resins for such substrate film can be made appropriately by taking into account the characteristics of each resin as shown in the below Table 1.

TABLE 1

| Category | Polystyrene | Polymethylmeth-acrylate | Polycarbonate | Polyethylene terephthalate |
|---|---|---|---|---|
| Density (g/cm³) | 1.06 | 1.19 | 1.2 | 1.4 |
| Izod impact value (Kg · cm/cm) | 1.4-2.8 | 2.2-2.8 | 80-100 | |
| Absorption rate (%) | 0.1 | 2 | 0.4 | |
| Light-beam transmittance (%) | 88-90 | 92-93 | 87-89 | |
| Refractive Index | 1.59 | 1.49 | 1.59 | 1.53-1.6 |
| Heat resistance (° C.) Tg | 80-100 | 72-105 | 145-150 | 69 |
| DTUL: High Load | 74-90 | 68-99 | 138-142 | |
| Advantages | Hard, good transparency, good surface hardness, good fluidity, good molding stability, good secondary | Good transparency, good weatherability, good surface hardness, good surface luster, good moldability, low birefringence | Good impact resistance, good heat resistance, good mechanical property, low moist absorption, | Good electrical property, good mechanical property, good impact resistance, good weatherability, |

TABLE 1-continued

| Category | Polystyrene | Polymethylmeth-acrylate | Polycarbonate | Polyethylene terephthalate |
|---|---|---|---|---|
| | | processing, good electrical property, good absorption | good size stability, good weatherability | high melting point |
| Disadvantages | Low impact resistance, low chemical resistance, Low weatherability | Deformable at 100° C., Low impact resistance High absorption, low size stability, Low chemical resistance | Low chemical resistance, Low surface hardness, High birefringence | Low injection moldability, Low alkali resistance, Low impact resistance |

Hereinafter, the present disclosure will be described more specifically by way of the following Examples. However, the present disclosure is not limited to such Examples.

EXAMPLES

Example 1

(1) Production of Microlenses

A metallic mold having a pitch of 200 μm as a period was prepared using a diamond bite with radii of curvature $R_1$ of 100 μm and $R_2$ of 185 μm, and the mold was filled with a ultraviolet-curable resin (acrylic resin) having a refractive index of 1.54. Next, the ultraviolet-curable resin to be filled into the mold was put on a polyester film having a thickness of 188 μm, and then ultraviolet ray was irradiated thereon to cure. After that, the mold was removed to obtain a microlens group.

(2) Production of Protuberances and Reflective Layers

On the reverse side of the microlens group which has been obtained in the process of production of microlenses, a photosensitive resin was applied such that the thickness of the resin after dry is 40 μm. A photo-cure reaction was performed to form a protuberance pattern using a photomask which has been designed such that the center of each protuberance 6 which ha a reflective layer of a width of 40 μm was located at the center of the pitch 10 of each microlens with respect to the light emission control part 7, and then non-patterned parts were removed using resist stripper composition to form a protuberance. After that, paint consisting of an acrylic resin having titanium dioxide scattered therein was applied on the formed protuberance in a gravure printing method and was heat-cured to produce a reflective layer.

Example 2

(1) Production of Microlenses

A metallic mold having a pitch of 200 μm as a period was prepared using a diamond bite with radii of curvature $R_1$ of 100 μm and $R_2$ of 175 μm, and the mold was filled with a ultraviolet-curable resin (acrylic resin) having a refractive index of 1.54. Next, the ultraviolet-curable resin to be filled into the mold was put on a polyester film having a thickness of 188 μm, and then ultraviolet ray was irradiated thereon to cure. After that, the mold was removed to obtain a microlens group.

(2) Production of Protuberances and Reflective Layers

The same procedure as in Example 1 was applied.

Example 3

(1) Production of Microlenses

A metallic mold having a pitch of 200 μm as a period was prepared using a diamond bite with radii of curvature $R_1$ of 100 μm and $R_2$ of 165 μm, and the mold was filled with a ultraviolet-curable resin (acrylic resin) having a refractive index of 1.54. Next, the ultraviolet-curable resin to be filled into the mold was put on a polyester film having a thickness of 188 μm, and then ultraviolet ray was irradiated thereon to cure. After that, the mold was removed to obtain a microlens group.

(2) Production of Protuberances and Reflective Layers

The same procedure as in Example 1 was applied.

Comparative Example (1) Production of microlenses

A metallic mold having a pitch of 200 μm as a period was prepared using a diamond bite with a radius of curvature of 100 μm, and the mold was filled with a ultraviolet-curable resin (acrylic resin) having a refractive index of 1.54. Next, the ultraviolet-curable resin to be filled into the mold was put on a polyester film having a thickness of 188 μm, and then ultraviolet ray was irradiated thereon to cure. After that, the mold was removed to obtain a microlens group.

(2) Production of Protuberances and Reflective Layers

On the reverse side of the microlens group which had been obtained in the process of production of microlenses, a photosensitive resin was applied such that the thickness of the resin after dry is 40 μm. A photo-cure reaction was performed to form a protuberance pattern using a photomask which had been designed such that the center of the protuberance 6 which has a reflective layer of a width of 40 μm corresponds with the location of the lowest part between the unit microlenses, and then non-patterned parts were removed using resist stripper composition to form a protuberance. After that, paint consisting of an acrylic resin having titanium dioxide scattered therein was applied on the formed protuberance in a gravure printing method and was heat-cured to produce a reflective layer.

Measurement and Evaluation Methods (1) Measurement of Frontal Brightness

Frontal brightness was recorded on a Topcon Corp. BM-7 and values are reported as averages of nine measurements.

(2) Half-Power Angle Measurement

Half-power angles were measured with a Topcon Corp. BM-7 by finding the angle for 50% brightness of peak brightness or maximum brightness by measuring the brightness for viewing angles of a range of −80° to +80°.

(3) Simulation

Light Tools 6.2 was used for simulation.

The frontal brightness and half-power angle were measured as described above, and the results are shown in Table 2.

TABLE 2

Figure 3:
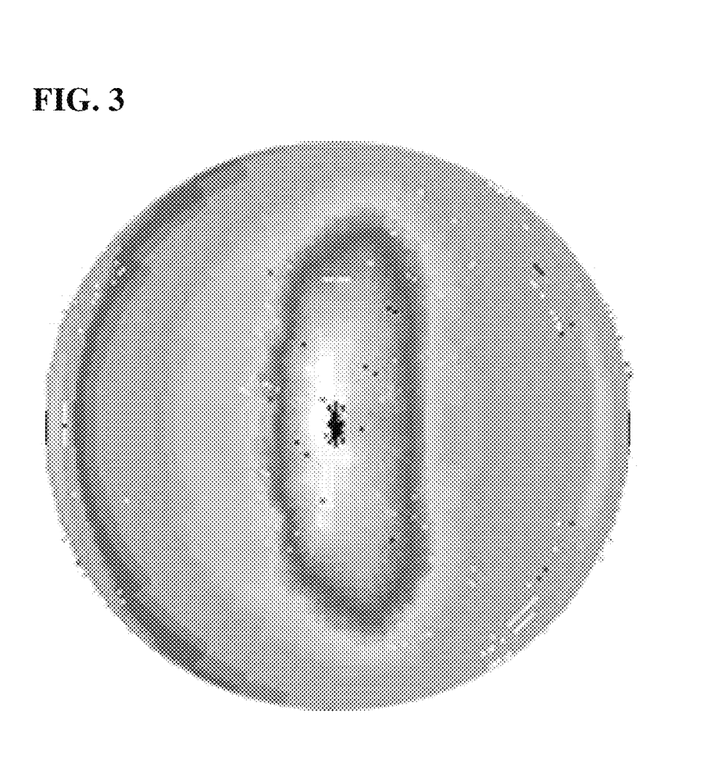
FIG. 3 is a simulation of the result from Example 2.
Figure 4:
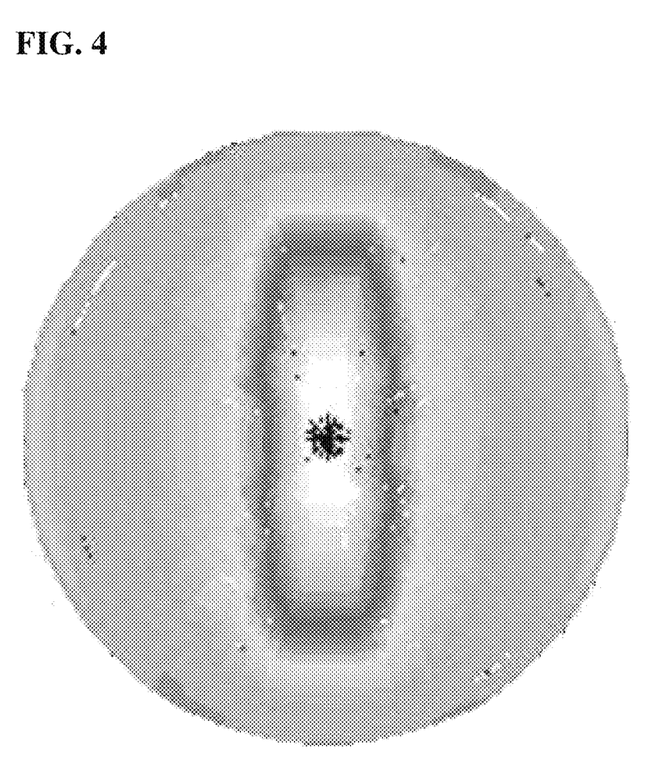
FIG. 4 is a simulation of the result from Comparative Example.

| Category | Radius of curvature (μm) | | Frontal Brightness | Half-power angle (degree) | | Simulation |
|---|---|---|---|---|---|---|
| | $R_1$ | $R_2$ | (cd/m$^2$) | First side | Second side | |
| Example 1 | 100 | 185 | 950 | 40 | 50 | — |
| Example 2 | 100 | 175 | 970 | 40 | 47 | FIG. 3  |
| Example 3 | 100 | 165 | 980 | 40 | 43 | — |
| Comparative Example | 100 | | 1000 | 40 | | FIG. 4  |

As can be seen from the results of Examples 1, 2 and 3 of Table 2, the optical sheet that has different radii of curvature with respect to the light emission control part had different half-power angles in the directions of the first side and second side, compared with the case of Comparative Example which has the same radii of curvature on both sides, suggesting that the direction of light rays can be controlled by controlling the radius of curvature of microlenses. In particular, Example 2 shows an increased viewing angle by about 18% compared with Comparative Example for the similar range of brightness values. In addition, the simulation results showed that Example 2 provides more light emission in the direction of the second side compared with Comparative Example.

The disclosure has been described in detail with particular reference to examples and embodiments thereof among various embodiments that had been carried out by the present inventors, but it will be understood that variations and modifications can be effected by those skilled in the art without departing from the scope of the disclosure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. An optical sheet for controlling the direction of light rays comprising:
   a substrate film;
   a microlens group arranged on a first face of the substrate film; and
   a plurality of protuberances formed on a second face of the substrate film,
   wherein each protuberance comprises a reflective layer at a bottom thereof, and the plurality of protuberances comprise an aperture formed therebetween, wherein a unit microlens of the microlens group has a first side, a second side and a light emission control part formed at a highest part of the first face of the substrate film, and a radius of curvature (R1) of the first side is not greater than a radius of curvature (R2) of the second side to form an asymmetrically curved surface of the unit microlens, and wherein each of R1 and R2 is in the range of 10 μm to 1,000 μm, and a ratio of R1 to R2 is about 100:175.

2. The optical sheet of claim 1, wherein the ratio of area taken by the apertures between the protuberances is about 10% to about 90% of the total area of the second face of the substrate film, and each protuberance is formed such that the center of the protuberance is located at a pitch center of the unit microlens with respect to the light emission control part.

3. The optical sheet of claim 1, wherein the reflective layer has a thickness of about 1 μm to about 100 μm.

4. The optical sheet of claim 1, wherein the unit microlens has a height of about 1 to about 2 times of a pitch thereof.

5. The optical sheet of claim 1, wherein the radius of curvature of the first side is 100 μm and the radius of curvature of the second side is 175 μm.

6. The optical sheet of claim 1, wherein an angle of the first side of each microlens relative to the substrate film form an angle $\theta_1$ which is equal to or greater than 10° and less than 90°, and an angle of the second side of each microlens relative to the substrate film form an angle $\theta_2$ which is equal to or greater than 10° and less than 90°.

7. A backlight assembly comprising the optical sheet of claim 1.

8. The backlight assembly of claim 7, wherein the ratio of area taken by the apertures between the protuberances is about 10% to about 90% of the total area of the second face of the substrate film, and each protuberance is formed such that the center of the protuberance is located at a pitch center of the unit microlens with respect to the light emission control part.

9. The backlight assembly of claim 7, wherein the reflective layer has a thickness of about 1 μm to about 100 μm.

10. The backlight assembly of claim 7, wherein an angle of the first side of each microlens relative to the substrate film form an angle $\theta_1$ which is equal to or greater than 10° and less than 90°, and an angle of the second side of each microlens relative to the substrate film form an angle $\theta_2$ which is equal to or greater than 10° and less than 90°.

11. A Thin Film Transistor-Liquid Crystal Display (TFT-LCD) comprising the optical sheet of claim 1.

12. The TFT-LCD of claim 11, wherein the ratio of area taken by the apertures between the protuberances is about 10% to about 90% of the total area of the second face of the substrate film, and each protuberance is formed such that the center of the protuberance is located at a pitch center of the unit microlens with respect to the light emission control part.

13. The TFT-LCD of claim 11, wherein the reflective layer has a thickness of about 1 μm to about 100 μm.

14. The TFT-LCD of claim 11, wherein the unit microlens has a height of about 1 to about 2 times of a pitch thereof.

15. The TFT-LCD of claim 11, wherein an angle of the first side of each microlens relative to the substrate film form an angle $\theta_1$ which is equal to or greater than 10° and less than 90°, and an angle of the second side of each microlens relative to the substrate film form an angle $\theta_2$ which is equal to or greater than 10° and less than 90°.

\* \* \* \* \*